No. 769,205.

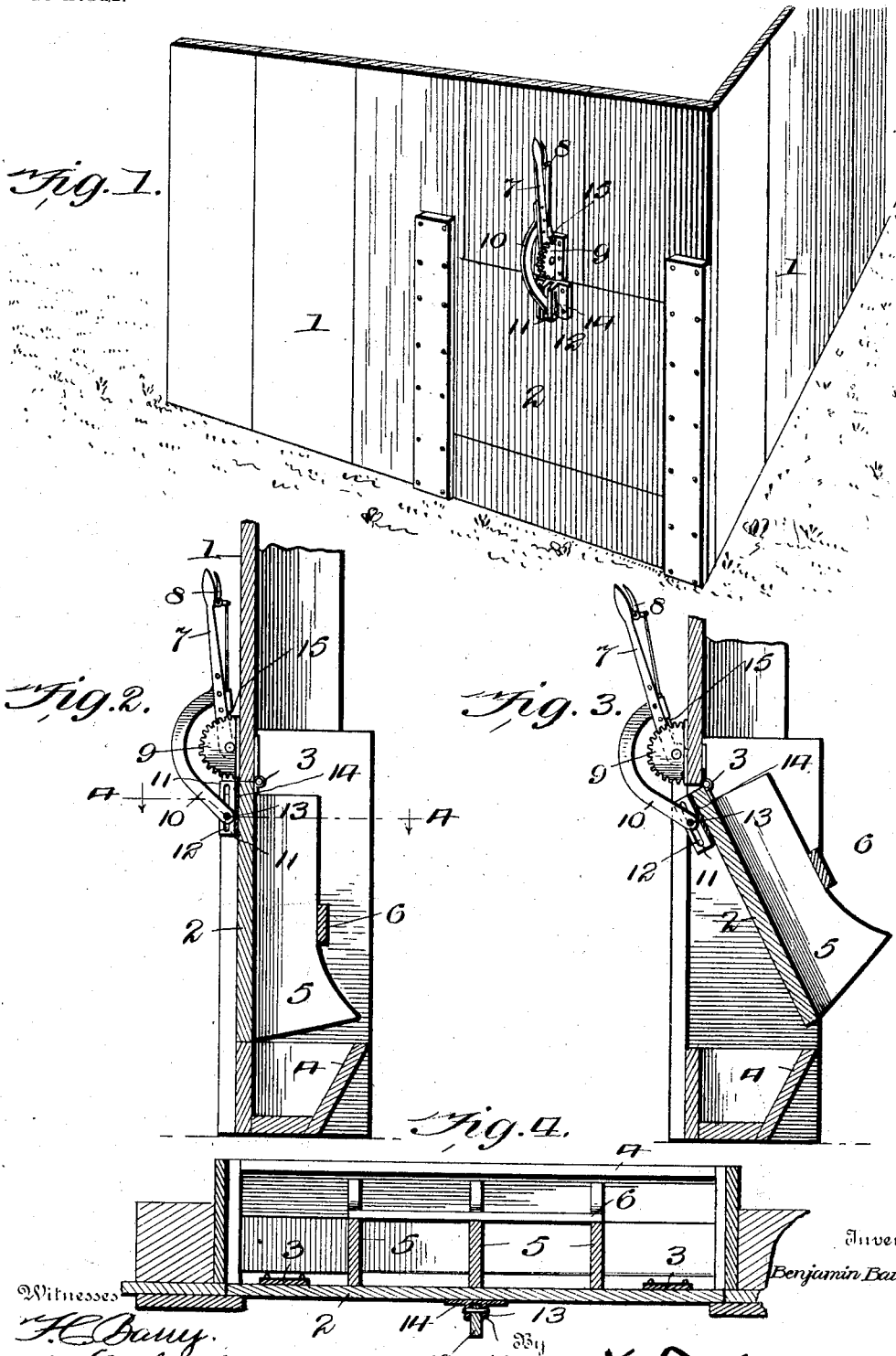

Patented September 6, 1904.

UNITED STATES PATENT OFFICE.

BENJAMIN BAUGHMAN, OF REYNOLDS, NEBRASKA.

ANIMAL-FEEDING APPLIANCE.

SPECIFICATION forming part of Letters Patent No. 769,205, dated September 6, 1904.

Application filed December 29, 1903. Serial No. 187,060. (No model.)

*To all whom it may concern:*

Be it known that I, BENJAMIN BAUGHMAN, a citizen of the United States, residing at Reynolds, in the county of Jefferson and State of Nebraska, have invented certain new and useful Improvements in Animal-Feeding Appliances; and I do hereby declare the following to be a full, clear, and exact description of the invention, such as will enable others skilled in the art to which it appertains to make and use the same.

My invention relates to stock-feeding appliances, and more particularly to an appliance for feeding swine; and it consists of certain novel features of combination and construction of parts, the preferred form whereof will be hereinafter clearly set forth, and pointed out in the claims.

The prime object of my invention, among others, is to provide means for enabling the food to be placed within the trough or receptacle and at the same time prevent the animals from having access to such receptacle until after the attendant has completely prepared the food in readiness for them.

A further object is to enable the receptacle or trough to be readily cleansed from any accumulation of uneaten or inedible food, as will be readily understood from the following specification.

Other objects and advantages will be hereinafter made clearly apparent, reference being had to the accompanying drawings, which are made a part of this application, and in which—

Figure 1 shows a perspective view of my invention complete ready for use. Fig. 2 is a vertical section of my device, showing the swinging gate or door in a closed position. Fig. 3 is a similar view to that presented in Fig. 2, showing the swinging door or gate moved inward at its lower end to prevent the swine from having access to the trough or food-receptacle and in position to permit the attendant to place the food in readiness for the animals. Fig. 4 is a horizontal section of Fig. 2 on line 4 4.

Referring to the details of my invention and coöperating accessories, numerals will be employed, the same numeral applying to a similar part throughout the several views.

1 designates the walls of a fence or building, of the usual or any preferred construction, wherein a section thereof is removed, and within the opening thus formed I mount a gateway or movable member 2, which may be of any desired size or extent, and being hinged at its upper end by suitable supporting-hinges of any desired variety, as indicated by the numeral 3, the lower end thereof is left free to move inward, as shown in Fig. 3, whereby the food receptacle or trough 4 will be covered by the gateway and the swine prevented from having access to the food until the attendant has placed the food in readiness.

It is obvious that the trough-section or food-receptacle 4 may be made any desired length, preferably coincident with the length of the gate 2, suitable upright divisional members 5 being secured to the inner side of the gateway 2 and properly reinforced by the cross-bars 6, whereby each animal will be separated and prevented from disturbing its neighbor. In the present instance I have shown the inner side of the gateway as provided with three of the partition-walls 5, it being understood that said walls may be increased in number proportionately to the extent of the gate itself and the length of the trough 4.

It becomes desirable to provide means which will enable the attendant to readily and easily control the movement of the gate 2, and it is obvious that said gateway may be pushed inward at its lower end, as by the hand of the operator, and any suitable button or detent or a stick of suitable size may be disposed with one end in the trough-section and the other end against the gateway, so as to hold it in an inclined or open position. This plan of course will be the simplest way to secure the gateway that it may be held in an open position, though I prefer in most instances to employ the controlling means which I have illustrated in Figs. 1 and 2 and 3 and comprising the controlling-lever 7, having the auxiliary or detent-controlling lever 8, adapted to move the locking-detent into or out of engagement with the rack 9, secured at a proper point upon the wall of the building or the fence immediately above the gateway. Said lever 7 is provided with the downwardly and inwardly directed extension or arm 10, said arm fitting between the guideways or ears 11, said ears having the slotted openings 12 to receive a journal or lug 13 upon the lower end of the arm 10 and to compensate for change of position of the end of the arm relative to the movement of the door.

It will be understood that the end of the arm 10 is adapted to bear directly against the body portion 14 of the plate forming the ears 11, so as to reduce friction to a minimum point, and it therefore follows that by drawing downward upon the lever 7 the gate 2 is swung inward at its lower end, it requiring but a very small amount of force to open or close the gate, as will be obvious by reference to Figs. 2 and 3. Inasmuch as the lugs or journals 13 fit within the slotted openings 12, it follows that the arm 10 will reliably open or close the gate, though it will be understood that gravity will assist in the closing thereof, inasmuch as the gateway 2 normally occupies a vertical position when the controlling-detent 15 is released from engagement with one of the teeth upon the rack-bar 9.

The parts of my invention may be very cheaply manufactured and readily assembled each in its respective operative position, and while I have described the preferred combination and construction of parts I desire to comprehend in this application all such substantial equivalents and substitutes as may be considered as falling fairly within the scope and purview of my invention.

It is further obvious that when the gateway is moved inward at its lower end to occupy the position illustrated in Fig. 3 the animals will be prevented from having access to the trough-section, thus placing the trough in position to be cleansed by the attendant and filled with food without any annoyance from the animals upon the other side of the gateway, and when the food is in readiness the lever 7 is grasped by the attendant and the detent 15 disengaged from one of the teeth upon the rack-bar 9 and the gates allowed to assume a vertical position, the said detent again entering between two of the teeth upon the rack-bar, and thereby locking the gate in a closed position, and thus preventing an animal on the outside from entering through the gateway or over the trough-section 4. At times it is desirable to prevent the larger swine from having access to the food and at the same time permit the smaller animal or pigs to reach the food, and to accomplish this result the gate 2 is only partially closed after the food has been placed in the trough, the employment of the rack-bar and controlling-lever affording a means of properly adjusting the gate as desired. It is also obvious that the gate 2 may be elevated to or above a horizontal position, and thus providing a means of ingress to or egress from the pen or inclosure, obviating the necessity of an additional opening for such purpose, and, again, the gate may be so adjusted by means of the rack-bar and the levers as to afford a means of grading or separating the animals, the door being elevated only sufficiently to allow the smaller animals to pass in or out of the inclosure, as desired.

While in many instances the controlling-lever 7 and its accessories and its accompanying rack-bar may be wholly dispensed with and reliance placed upon a simple form of latch or locking-detent to hold the gateway in an inclined position, yet I reserve the right to employ in practice either form of construction which I may find most desirable.

Having thus fully described my invention, what I claim as new, and desire to secure by Letters Patent, is—

1. The combination with a suitable feeding-trough or food-receptacle located in line with the wall of an inclosure, of a gate hinged at its upper edge to an adjacent part of said wall, a plurality of partitions secured to the inner side of said gate, a rack secured to the wall adjacent to the upper edge of said gate, a controlling-lever pivotally secured to said rack, a detent and lever therefor carried by said controlling-lever, and an arm 10 also carried by said controlling-lever, the free end of which bears against the gate, whereby when said controlling-lever is operated, the gate will be opened or closed, as set forth.

2. In a controlling device for swinging closures or gates, the combination with the gate and support therefor, of a controlling-lever, a rack carried by said support, to which said controlling-lever is pivotally secured, a detent and controlling-lever therefor, an arm carried by said controlling-lever, slotted ears secured to the gate between which the free end of said arm takes, and a journal carried by the free end of said arm, the ends thereof intersecting said slots, whereby when said lever is moved, the gate will be opened or closed, as set forth.

In testimony whereof I have signed my name to this specification in the presence of two subscribing witnesses.

BENJAMIN BAUGHMAN.

Witnesses:
 JOEL T. BENNETT,
 PERSON BINGHAM.